United States Patent [19]

Fukutomi et al.

[11] Patent Number: 5,337,458
[45] Date of Patent: Aug. 16, 1994

[54] CORD STOPPER

[75] Inventors: Masaaki Fukutomi, Nabari; Hirokazu Watanabe, Kurobe, both of Japan

[73] Assignee: Yoshida Kogyo K.K., Tokyo, Japan

[21] Appl. No.: 94,333

[22] Filed: Jul. 20, 1993

[30] Foreign Application Priority Data

Jul. 21, 1992 [JP] Japan ............... 4-051102[U]

[51] Int. Cl.⁵ .................. A44B 17/00; F16G 11/00
[52] U.S. Cl. ................ 24/115 H; 24/115 G; 24/674
[58] Field of Search ........... 24/115 H, 115 G, 115 R, 24/136 R, 136 K, 136 L, 129 A, 49 R, 49 S, 674, 662

[56] References Cited

U.S. PATENT DOCUMENTS

| | | | |
|---|---|---|---|
| 189,274 | 4/1877 | Smith | 24/115 R |
| 736,306 | 8/1903 | Smith | |
| 2,134,037 | 10/1938 | Fenton | 24/674 |
| 3,074,135 | 1/1963 | Brodowski | 24/115 G |
| 3,597,808 | 8/1971 | Johnson | |
| 4,258,456 | 3/1981 | Thurston et al. | |
| 5,008,981 | 4/1991 | Smithson | 24/115 G |
| 5,175,911 | 1/1993 | Terrels et al. | 24/674 |

FOREIGN PATENT DOCUMENTS

| | | |
|---|---|---|
| 3300879 | 7/1984 | Fed. Rep. of Germany . |
| 49-14097 | 10/1969 | Japan . |
| 2-28736 | 12/1987 | Japan . |
| 0769646 | 3/1957 | United Kingdom ......... 24/115 G |

Primary Examiner—Victor N. Sakran
Attorney, Agent, or Firm—Hill, Steadman & Simpson

[57] ABSTRACT

A cord stopper releasably fastens a cord thereto. The cord stopper has a front body and a housing attached to a rear side of the front body. The housing has a through hole and a seat formed around the through hole. An annular spring rests on the seat. The annular spring is slightly less in diameter than the through hole so that the inner peripheral part of the annular spring appears beyond the periphery of the through hole. The cord is joined to the annular spring so that the cord is retained against the front body.

5 Claims, 6 Drawing Sheets

CORD STOPPER

BACKGROUND OF THE INVENTION

1. Field of the Invention

The present invention relates generally to a cord stopper used for garments, pouches, baggages etc. and more particularly to a cord stopper used for fastening a cord and allowing for length adjustability. When used on these articles, usually the cord stopper has its front surface used for decorative purposes.

2. Description of the Prior Art

A typical cord stopper of the type described is disclosed in Japanese Utility Model Publication No. 49-14097. The disclosed cord stopper generally comprises a front decorative plate having a threaded stud mounted centrally on the rear side thereof, a guide plate including a substantially fiat middle plate having a central through hole formed in the middle, a pair of juxstaposed upper tubes and a lower tube mounted on the rear side at the upper and lower end, respectively, of the middle plate; and a holding disk having a central threaded hole formed in the middle thereof. A cord is first threaded up through the single lower tube of the guide plate, then through one of the two upper tubes, then returns and passes through the other of the two upper tubes and is eventually threaded through the single lower tube again. After the cord is adjusted in length to the wearer's wish, the holding disk is screwed to the threaded stud of the decorative plate to thus retentively clamp the cord between the holding disk and the rear side of the guide plate.

Another cord stopper of this type is disclosed in Japanese Utility Model Publication No. 2-28736. The conventional cord stopper comprises a circular front plate and a rear plate having a through hole formed centrally thereof. The circular front plate has a pair of side flanges mounted one on each side of the rear side thereof and a basin interposed between the opposed side flanges with both ends thereof remaining open. The circular front plate also has a stud formed integrally on the middle of the basin. The stud has an inner threaded hole. For fastening a cord to the cord stopper, the cord is inserted into the basin from one end, wrapped around the stud and comes out of the basin through the end. Then, the rear plate is fitted over the stud to thus hold the cord against the basin of the circular front plate. And then, a separate screw is fitted into the through hole of the rear plate and screwed into the inner threaded hole of the stud so as to tightly fasten the cord between the front plate and rear plate.

However, these conventional cord stoppers suffer disadvantages.

Whenever the length of the cord needs to be adjusted in both types of conventional cord stoppers, it is absolutely necessary to first unscrew either the holding disk or the screw, adjust the cord length and then screw it again. Therefore, the adjustment of the length of the cord is very tedious and time-consuming with these two types of conventional cord stoppers.

SUMMARY OF THE INVENTION

With the foregoing difficulties in view, it is therefore an object of the present invention to provide a cord stopper in which a cord is fastened with great ease and the cord is easily adjusted in length and which is attractive in appearance.

According to one aspect of the present invention, there is provided a cord stopper for releasably fastening a cord thereto, cord stopper comprising a front body, a housing attached to a rear side of the front body, the housing having a through hole and a seal formed around the through hole, an annular spring resting on the seat, the annular spring being slightly less in diameter than the through hole so that the inner peripheral part of the annular spring appears beyond the periphery of the through hole, and means for joining the cord to the annular spring, thus holding the cord against the front body.

According to another aspect of the present invention, there is a cord stopper for releasably fastening a cord thereto, the cord stopper comprising dual front bodies disposed back to back, a pair of housings attached to the rear side of the respective front bodies, each housing having a through hole and a seat formed around the central hole, a pair of annular springs resting on the respective seats, each being slightly less in diameter than the through hole, so that the inner peripheral part of the annular spring appears beyond the periphery of the through hole, a cylinder having a pair of flared rims one formed at each end thereof and an elongated strip having two through holes formed therein and being folded over itself and wrapped around the cord with the two holes placed in registry with each other, the cylinder being fitted through the through holes of the cord-wrapping strip and then fitted at each flared rim through the annular spring, so that the interposed cord-wrapping strap is retentively held between the front bodies.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE PRESENTLY PREFERRED EMBODIMENT

Figure 9:
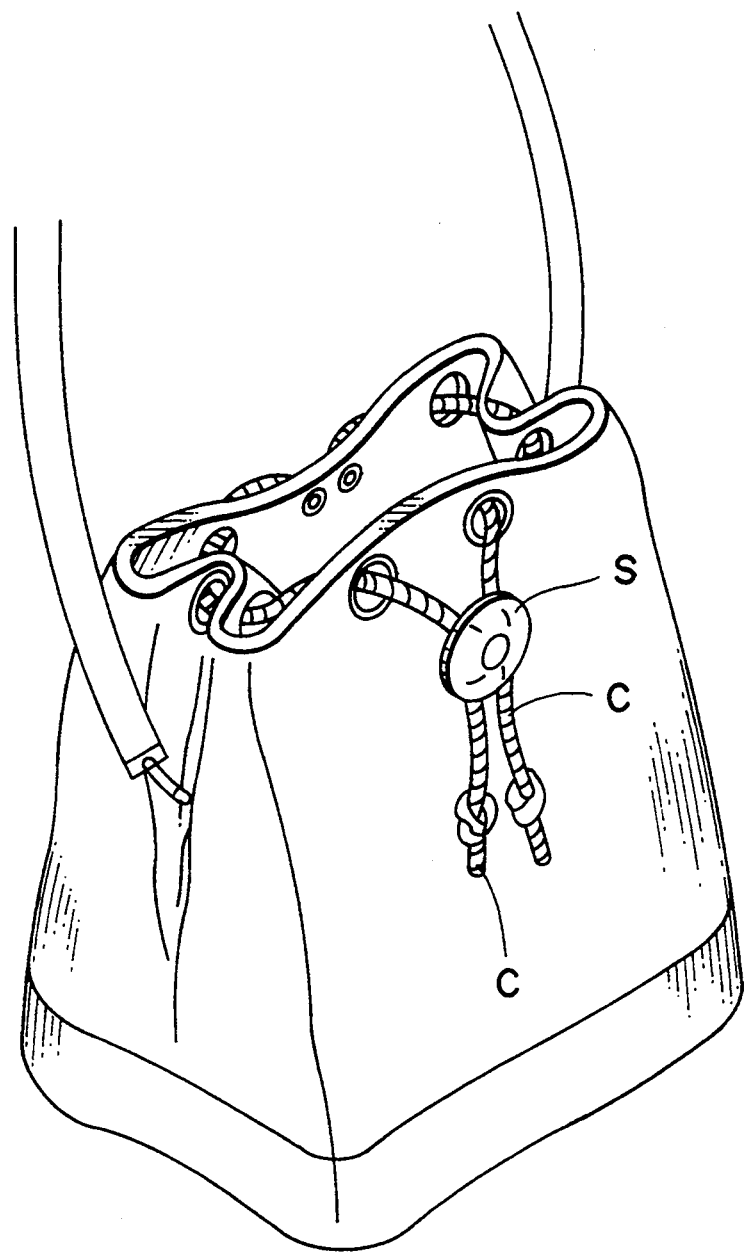
FIG. 9 is a perspective view of an embodiment of a cord stopper of the present invention shown for fastening a cord around a mouth of a pouch.

In FIG. 9, a cord stopper S according to the present invention is shown to be used for fastening a cord around a mouth of a pouch. Nevertheless, the cord stopper S may be used for garments, baggages, shoes and the like material.

Figure 1:
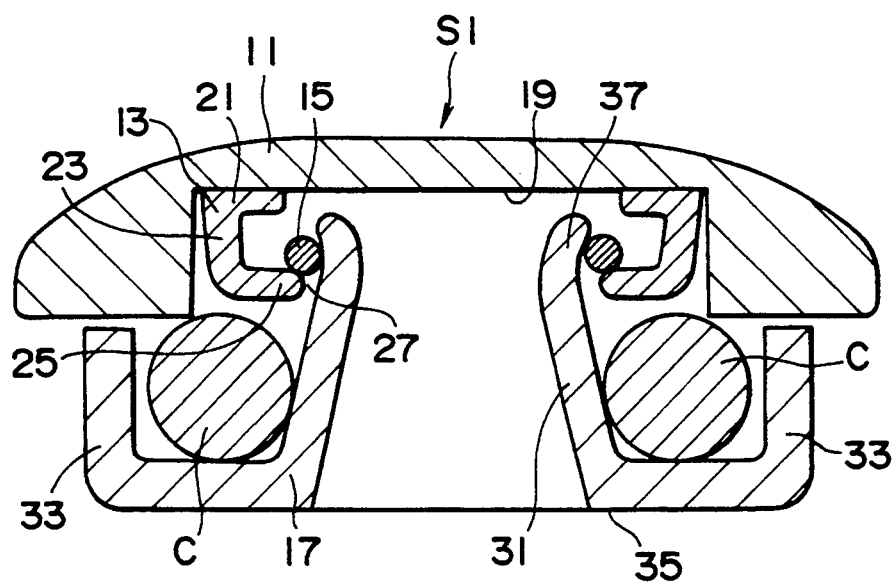
FIG. 1 is an enlarged cross-sectional view of a cord stopper according to the present invention.

Referring to FIG. 1, a cord stopper S1 according to a first embodiment of the present invention broadly comprises a substantially circular front body 11, an annular housing 13, an annular spring 15 and a cord holder 17. The circular front body 11 may be made of metal or plastics and may have its front side bear any decorative pattern or ornamental design. The circular front body 11 has a recess 19 formed in the rear side thereof. The annular housing 13 has an upper annular portion 21 and a lower annular portion 23 extending downward from the outer edge of the upper annular portion 21 and then radially inwardly to thus form a sear 25 for supporting the annular spring 15. The lower annular portion 23 has a central through hole 27 formed centrally thereof. The annular spring 15 is slightly less in diameter than the through hole 27 so that the annular spring 15 rests on the seat 25 with the inner peripheral part of the annular spring 15 appearing beyond the periphery of the through hole 27. After equipped with the annular spring 15, the annular housing 13 is fixed to the circular front body 11 by attaching the upper annular portion 21 to the bottom of the recess 19 such as with an adhesive.

Figure 2:
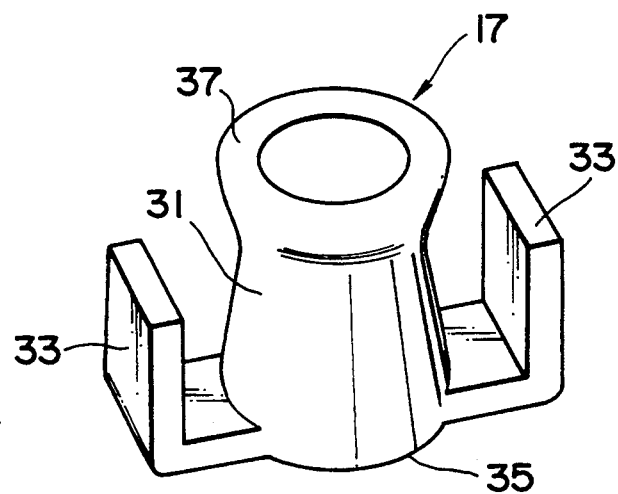
FIG. 2 is a perspective view of a cord holder of the cord stopper of FIG. 1.

As better shown in FIG. 2, the cord holder 17 comprises a hollow truncated-conical body 31 and a pair of channel flanges 33, 33 disposed in a diametrically opposed relation to each other and integrally extending radially outwardly from the lower edge 35 the truncated conical body 31. Each channel 33, 33 is adapted to support a cord C therein. The truncated body 31 is flared at its upper end to provide an upper flared rim 37 which is slightly greater in diameter than the annular spring 15.

In use, after a cord C is disposed in the opposed channel flanges 33, the truncated-conical body 31 is thrust through the central through hole 27 and through the annular spring 15. As soon as the upper rim 37 of the truncated conical body 31 passes beyond the annular spring 15 and comes into coupling engagement therewith, the upper rim 37 and hence the cord holder 17 as a whole are retained to the annular spring 15 so that the cord C supported in the channel flanges 33 is firmly retained against the rear side of the circular front body 11.

For adjusting the length of the cord C, it is not necessary to untighten a separate screw or a threaded-holed holding plate which would be required by the conventional cord stoppers. Pulling the cord C through the cord stopper alone could lead to adjustment or the cord length.

Figure 3:
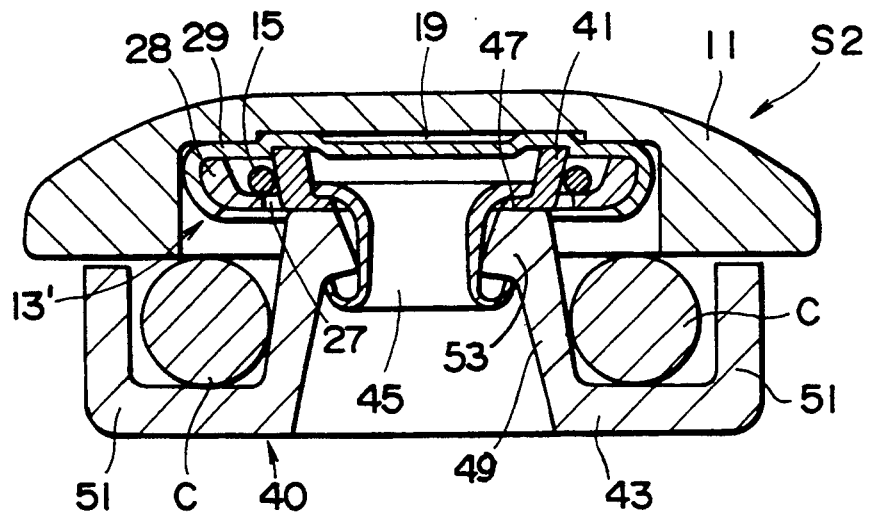
FIG. 3 is a cross-sectional view of a cord stopper according to another embodiment of the present invention.

FIG. 3 shows a cord stopper S2 according to a second embodiment. The cord stopper S2 is substantially identical to S1 according to the first embodiment except for the following two features. For one thing, instead of the one-piece cord holder 17 of the cord stopper S1, the cord holder 40 of the cord stopper S2 is a three-piece construction and comprises a connector ring 41, a cord carrier 43 and a clamping tube 45. The connector ring 41 has its outer periphery flared upward and has an inner peripheral flange 47 extending radially inward from the lower edge thereof. The connector ring 41 is made slightly greater in diameter than the annular spring 15. The cord carrier 43 includes a truncated conical body 49 and a pair of channel flanges 51 disposed in a diametrically opposed relation to each other and integrally extending radially outwardly from the lower edge of the truncated conical body 49 for supporting the cord C therein. The truncated conical body 49 has an inner peripheral flange 53 formed along the upper rim thereof. The cord carrier 43 is joined to the bottom of the connector ring 41 by causing the clamping tube 45 to clamp the inner peripheral flanges 53, 47 of the cord carrier 43 and the connector ring 41, respectively.

Furthermore, instead of a one-piece annular housing 13 of the cord stopper S1, the annular housing 13' of the cord stopper S2 is a two-piece construction and comprises an annular dish 28 having a central through hole 27 formed therein and a flat hood 29 mounted on the annular dish 28 by caulking or curling the periphery of the flat hood 29 over the peripheral edge of the annular dish 28. The thus assembled annular housing 13' is fixed to the front body 11 by attaching the flat hood 29 to the bottom of the recess 19 by means of an adhesive or other suitable means.

Figure 4:
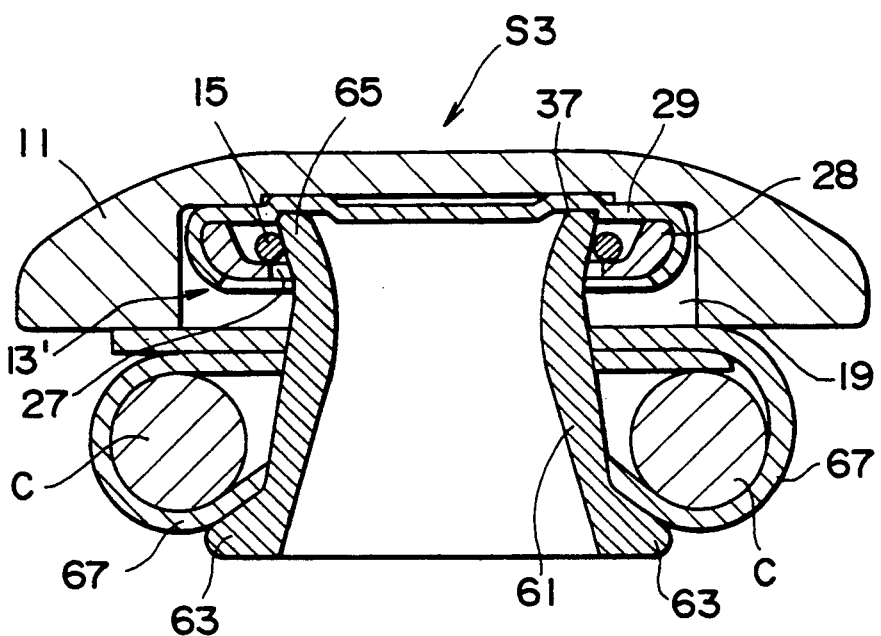
FIG. 4 is a cross-sectional view of a cord stopper according to still another embodiment of the present invention.
Figure 5:
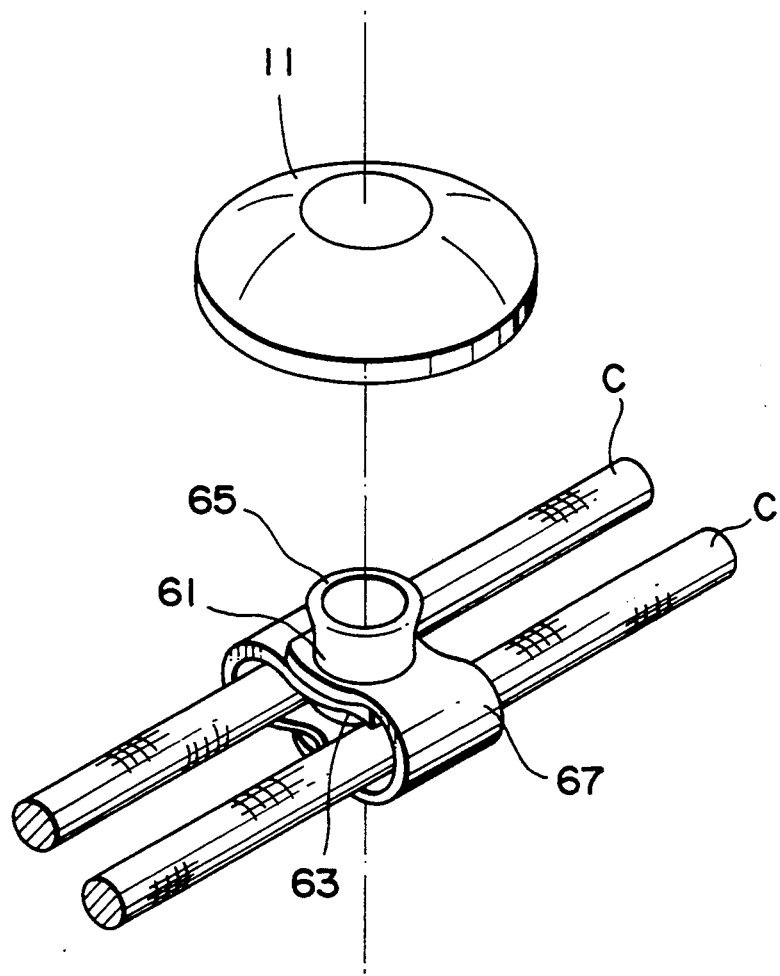
FIG. 5 is an exploded perspective view of the cord stopper of FIG. 4, showing a first phase of fastening of a cord to the cord stopper.
Figure 6:
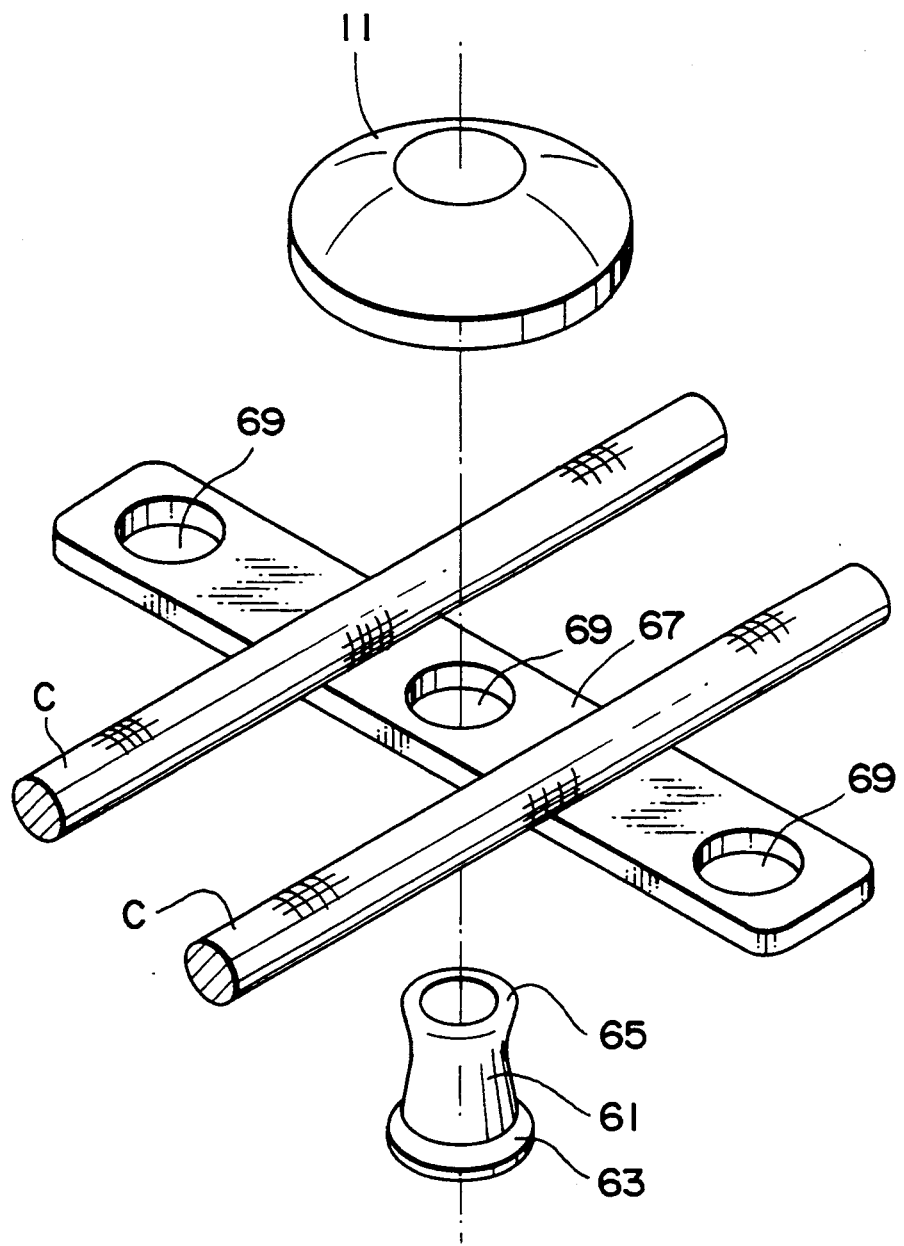
FIG. 6 is a view similar to FIG. 5, showing a second phase of the fastening.

FIGS. 4, 5 and 6 show a cord stopper S3 according to a third embodiment of the present invention. The cord stopper S3 is substantially identical with the cord stopper S1 according to the second embodiment except that the channeled cord holder 17 of the cord stopper S1 is replaced with a truncated-conical base 61 and an elongated band or strip 67. The truncated-conical base 61 has a lower peripheral flange 03 integrally extending radially outwardly from its lower peripheral edge. The truncated-conical base 61 has at its upper end an upper flared rim 65 which is slightly greater in diameter than the annular spring 15. The elongated strip 67 is made of a somewhat flexible material such as leather, rubber, plastics or the like. As better shown in FIG. 6, the substantially rectangular strip 67 has a plurality of (three in FIG. 6) through holes 69 formed at intervals along the length thereof. Preferably, each hole 69 is slightly less in diameter than the upper flared rim 65 of the truncated-conical base 61 or the connector ring 41.

In use, as better shown in FIG. 6, two parts of a folded cord C are put on the strip 67 one between each of the adjacent holes 69. As shown in FIG. 5, the strip 67 is folded over itself and is wrapped around the two parts of the cord C with of all the holes 69 placed in registry with each other. The truncated conical base 61 is threaded through the holes 69 of the thus folded strip 67. As shown in FIG. 4, the truncated conical base 61 is further threaded through the central through hole 27 of the annular housing 13 and then through the annular spring 15. As soon as the upper rim 37 of the truncated conical base 61 passes beyond the annular spring 15 and comes into coupling engagement therewith, the upper rim 37 and hence the truncated conical base 61 as a whole are retained to the annular spring 15, so that the cord-wrapping strip 67 is firmly retained against the rear side of the front body 11. Although the annular housing 13 is shown, here in FIG. 4, to comprise an annular dish 28 and a flat hood 29, the annular housing 13' may be formed as a one-piece part like the annular housing 13 shown in FIG. 1. Once joined to the annular spring 15, the truncated-conical base 61 can never be detached therefrom, so that the strip 67 is never removed from the truncated conical base 61.

Figure 7:
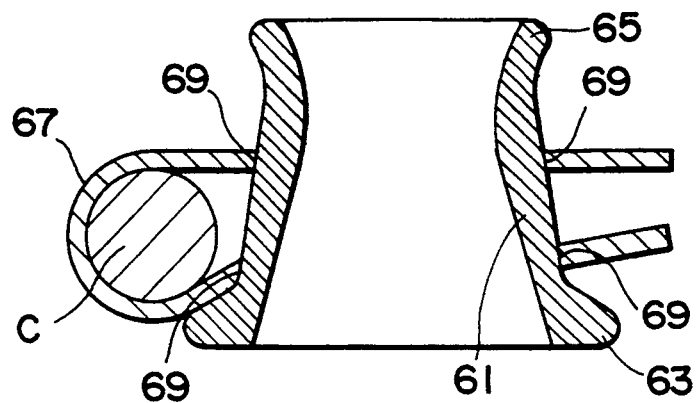
FIG. 7 is a fragmental cross-sectional view of still another embodiment.

FIG. 7 shows a truncated conical base 61 and a strip 67 which is substantially identical with those shown in FIG. 4 with the exception that the strip 67 has only two holes 69 so that it is only one cord C which the strip 67 is wrapped around.

Figure 8:
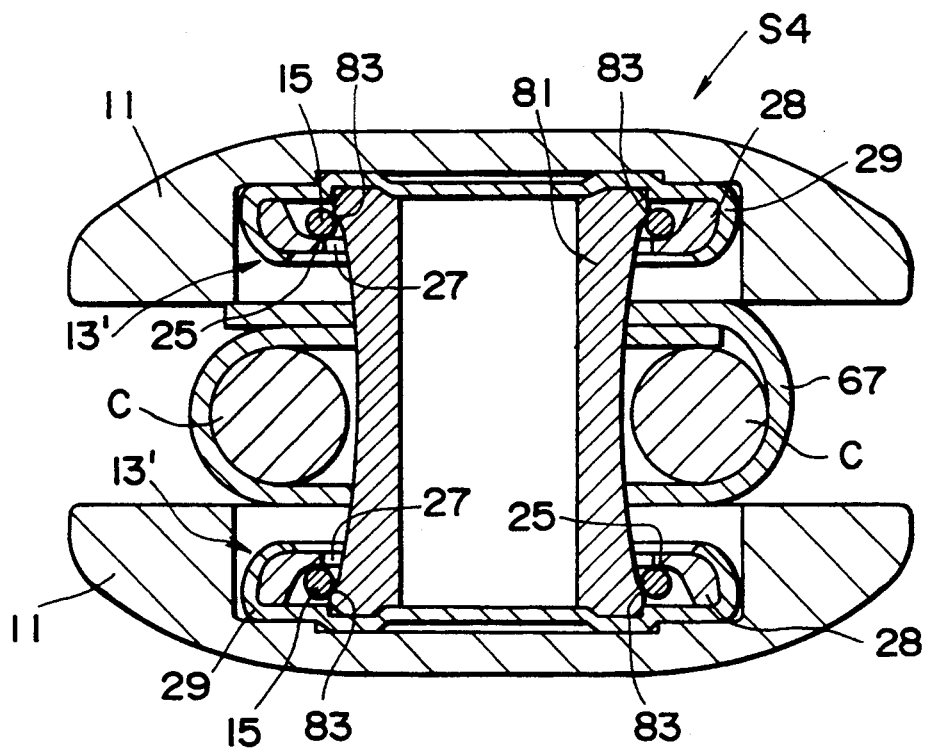
FIG. 8 is a cross-sectional view of a cord stopper according to yet another embodiment.

FIG. 8 shows a cord stopper S4 according to a fourth embodiment of the present invention. The cord stopper S4 is substantially identical with the cord stopper S3 according to the third embodiment with the following exception. Instead of only one front body 11, there are provided dual front bodies 11, 11 disposed back to back. Correspondingly, there are a pair of annular housings 13, 13 each attached to the rear side of the respective front bodies 11, 11. Each of the housings 13, 13 has a central through hole 27 and has a seat 25 formed around the central through hole 27. Furthermore, there are a pair of annular springs 15, one resting on each seat 25. Each annular spring 15 is slightly less in diameter than the through hole 27, so that the inner peripheral part of the annular spring 15 appears beyond the periphery of the central through hole 27. A cylinder 81 has a pair of flared rims 83 one formed at each end.

In assembly, the strap 67 is folded over itself, wrapping around the cord C. The cylinder 81 is first fitted through the holes 69 of the cord-wrapping strip 67 and then fitted at each rim 83 through the annular spring 15 so that the interposed cord-wrapping strap 67 is retentively held between the front bodies 11, 11. Since this cord stopper S4 has the dual front bodies 11, 11, the wearer may use this cord stopper S4 indiscriminately or without regard to which side is the front.

In the cord stopper according to any of the embodiments set forth hereinabove, for adjusting the length of the cord C, it is only necessary, to pull the cord C through the, cord stopper.

With the construction set forth hereinabove, the present invention has the following advantageous effects.

The cord stoppers may be assembled at great ease.

For adjusting the length of the cord on the cord stoppers, it is just necessary to pull the cord through the cord stoppers.

Since the assemblage of the cord stoppers requires no screw, the cord stoppers are immune from accidental loosening and subsequent loss of the screw which might occur with the conventional cord stoppers, Consequently, the cord stopper can accomplish satisfactory function for a prolonged period of time.

Obviously, the skilled person would realize that various modifications and variations of the present invention are possible in the light of the above teaching. It is, therefore, to be understood that within the scope of the appended claims the invention may be practiced otherwise than as specifically described, and that the invention is not limited to the embodiments described above in detail.

What is claimed is:

1. A cord stopper for releasably fastening a cord thereto, the cord stopper comprising a front body, a housing attached to a rear side of the front body, the housing having a through hole and a seat formed around the through hole, an annular spring resting on the seat, the annular spring being slightly less in diameter than the through hole so that the inner peripheral part of the annular spring appears beyond the periphery of the through hole, and means for joining the cord to the annular spring, thus holding the cord against the front body, the means for joining having a truncated-conical body and a means for holding the truncated-conical body for supporting the cord therein.

2. The cord stopper according to claim 1, wherein the means for holding further comprises channel flanges integrally extending radially outwardly from the lower edge of the truncated-conical body wherein the truncated-conical body being diverged upward adjacent to its upper end to thus provide an upper flared rim which is slightly greater in diameter than the annular spring, the annular spring coming into coupling engagement with the upper flared rim, thus holding the cord supported by the channel flanges against the rear side of the front body.

3. The cord stopper according to claim 1 wherein the means for holding comprises a connector ring having a base and a pair of channel flanges integrally extending radially outwardly from a lower edge of the truncated-conical body for supporting the cord therein, the connector ring having its outer periphery flared upward and made slightly greater in diameter than the annular spring, the truncated-conical body joined to the base of the connector ring, the annular spring coming into coupling engagement with the flared connector ring, thus holding the cord supported by the channel flanges against the rear side of the front body.

4. The cord stopper according to claim 1 wherein the truncated-conical body has a lower peripheral flange integrally extending radially outwardly from a lower edge thereof and having at its upper end an upper flared rim which is slightly greater in diameter than the annular spring; and the means for holding comprising an elongated strip having two holes formed therein and being folded over itself and wrapped around the cord with the two through holes placed in registry with each other, the truncated-conical base being threaded through the holes of the thus folded strip, the annular spring coming into coupling engagement with the upper flared rim, thus holding the cord wrapped by a strip against the rear side of the front body.

5. A cord stopper for releasably fastening a cord thereto, the cord stopper comprising dual front bodies disposed back to back, a pair of housings attached to the rear side of the respective front bodies, each housing having a through hole and a seat formed around the central hole, a pair of annular springs resting on the respective seats, each being slightly less in diameter than the through hole, so that the inner peripheral part of the annular spring appears beyond the periphery of the through hole, a cylinder having a pair of flared rims one formed at each end thereof and an elongated strip having two through holes formed therein and being folded over itself and wrapped around the cord with the two holes placed in registry with each other, the cylinder being fitted through the through holes of the cord-wrapping strip and then fitted at each flared rim through the annular spring, so that the interposed cord-wrapping strap is retentively held between the front bodies.

* * * * *